United States Patent [19]
Takeuchi

[11] Patent Number: 5,422,678
[45] Date of Patent: Jun. 6, 1995

[54] VIDEO PROCESSOR FOR ENLARGING AND CONTRACTING AN IMAGE IN A VERTICAL DIRECTION

[75] Inventor: Kesatoshi Takeuchi, Suwa, Japan

[73] Assignee: Seiko Epson Corp., Tokyo, Japan

[21] Appl. No.: 212,643

[22] Filed: Mar. 11, 1994

Related U.S. Application Data

[63] Continuation of Ser. No. 930,549, Sep. 29, 1992, abandoned.

[30] Foreign Application Priority Data

Jan. 29, 1991 [JP] Japan .................... 3-008967

[51] Int. Cl.⁶ .................... H04N 5/262
[52] U.S. Cl. .................... 348/581; 345/127
[58] Field of Search .................... 348/537, 581, 580; 358/451, 452, 448, 160, 21 R, 149, 22, 183, 148, 158, 140, 138, 180; 345/127, 128, 129, 130, 131; 382/47; H04N 5/907, 5/262, 3/223, 1/393, 9/74

[56] References Cited

U.S. PATENT DOCUMENTS

| | | | |
|---|---|---|---|
| 4,454,537 | 6/1984 | Okada et al. | 358/451 X |
| 4,651,225 | 3/1987 | Yamada | 358/451 |
| 4,780,759 | 10/1988 | Matsushima et al. | 548/537 |
| 4,952,923 | 8/1990 | Tamura | 340/731 |
| 5,068,651 | 11/1991 | Takebe et al. | 340/814 |
| 5,068,731 | 11/1991 | Takeuchi | 358/140 X |

FOREIGN PATENT DOCUMENTS

| | | |
|---|---|---|
| 4231208 | 8/1982 | Germany. |
| 0053880 | 3/1986 | Japan. |
| 0136174 | 6/1987 | Japan. |
| 0144647 | 11/1988 | Japan. |
| 2085257 | 4/1982 | United Kingdom. |
| 0000789 | 1/1990 | WIPO .................... 358/160 |

OTHER PUBLICATIONS

IBM Technical Disclosure Bulletin, vol. 29, No. 11, Apr. 1987, "Programmable Dot Clock For Video Adapter".

*Primary Examiner*—James J. Groody
*Assistant Examiner*—David E. Harvey
*Attorney, Agent, or Firm*—Spensley Horn Jubas & Lubitz

[57] ABSTRACT

A video processor which is capable of arbitrarily expanding or contracting an image in a vertical direction is described. A horizontal synchronizing signal HS of a video signal CS is inputted to a reference input terminal 63a of a phase comparator 63 of a PLL circuit 62 to take out a clock signal CK having a frequency N1 times larger than that of the horizontal synchronizing signal HS. This clock signal is frequency-divided by N2. Since N2 is set to the number of horizontal synchronizing signals within a vertical synchronous period, the number of sampling lines in a vertical direction becomes equal to N1. Accordingly, When an output signal (line clock signal LCK) of the frequency divider 67 is used as a signal for increment of a vertical address of a video memory 70, enlargement/contraction of an image can be carried out by changing N1.

6 Claims, 6 Drawing Sheets

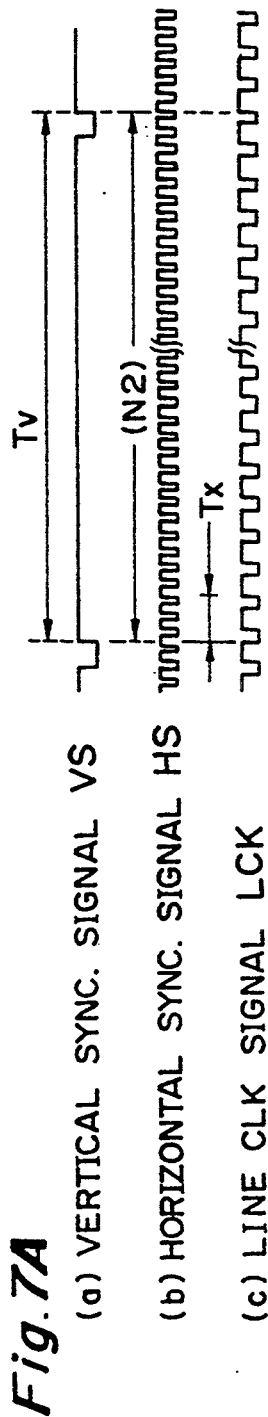
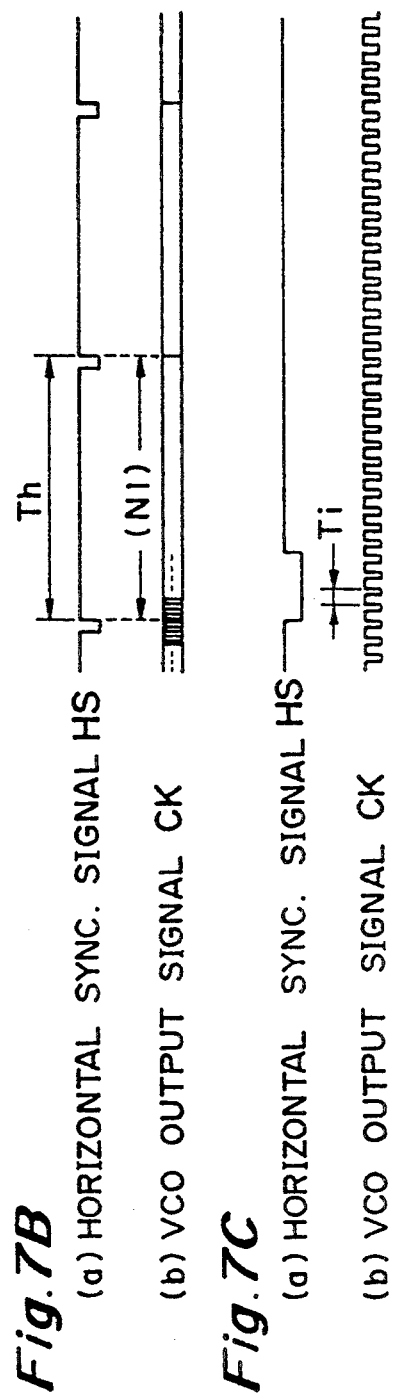
Fig. 7A
(a) VERTICAL SYNC. SIGNAL VS
(b) HORIZONTAL SYNC. SIGNAL HS
(c) LINE CLK SIGNAL LCK
Fig. 7B
(a) HORIZONTAL SYNC. SIGNAL HS
(b) VCO OUTPUT SIGNAL CK
Fig. 7C
(a) HORIZONTAL SYNC. SIGNAL HS
(b) VCO OUTPUT SIGNAL CK

VIDEO PROCESSOR FOR ENLARGING AND CONTRACTING AN IMAGE IN A VERTICAL DIRECTION

This is a continuation of application Ser. No. 07/930,549, filed on Sep. 29, 1992, now abandoned.

TECHNICAL FIELD

This invention relates to a video processor adapted for enlarging or contracting an image in a vertical direction, and more particularly to a video processor adapted for carrying out enlargement/contraction of an image by an address control in a vertical direction in a write-/read operation With respect to a video memory in which video data is stored.

BACKGROUND ART

In this invention, an approach is employed as the premise to once write a luminance signal in a composite video signal CS into a video memory as video data thereafter to read out the video data for a second time to display it on a monitor. On this premise, by carrying out an address control in a write/read operation of video data with respect to the video memory, expansion/contraction in a vertical direction of an image is attained.

FIG. 1 is a block diagram showing a conventional video processor. A PLL (Phase Locked Loop) circuit 9 is a circuit adapted for generating a line clock signal for incrementing an address in a vertical direction of a video memory 7. To a reference input terminal 1(a) of a phase comparator 1 in the PLL circuit 9, a vertical synchronizing signal separated and extracted from a composite video signal CS is inputted. A signal outputted from the phase comparator 1 is applied to a VCO (Voltage Controlled Oscillator) 3 through a loop filter 2. The VCO 3 generates a clock signal having a frequency corresponding to its input signal voltage. This clock signal is used as a vertical line clock signal for video memory 7. This clock signal outputted from VCO3 is frequency-divided by M at a frequency divider 8. The frequency-divided signal thus obtained is fed back to a phase comparison input terminal 1(b) of the phase comparator 1. By employing such a configuration, a line clock signal CK having a period Tx synchronous in phase with the vertical synchronizing signal is obtained (It is to be noted that the period Tx is expressed as Tx=Tv/M; Tv is a period of the vertical synchronizing signal).

In the above-described conventional video processor, by allowing the frequency-dividing ratio M value of the frequency divider 8 to have several tens to several thousands of lock ranges (upper limit/lower limit frequency variable widths of a frequency in a lock state), expansion (enlargement) or contraction in a vertical direction is realized. However, generally, in the case where a PLL circuit is used, it is stable minimum range to set the width of lock ranges in which ratio of maximum range is about ten. Further, in accordance with a present technical level, it is expected that the lock range is allowed to be as narrow as possible to thereby construct a stable PLL circuit.

FIG. 2 is a view showing an image fluctuation phenomenon in the conventional processor shown in FIG. 1. An image display area 12 is displayed within a monitor 11. There is shown an image fluctuation state 13 in a vertical direction occurring in the case where the lower portion of the image display area 12 is expanded (enlarged) or contracted in a vertical direction.

FIG. 3 is a view similarly showing an image flicker phenomenon in the same conventional processor. Because of a jitter due to a phase fluctuation (frequency noise superimposed on a fixed frequency) of a line clock signal applied to the video memory 7, there takes place a line jumping phenomenon in a vertical direction with respect to the video memory 7. As a result, an image flicker 14 in the form of a lateral line appears on a monitor.

FIGS. 4 and 5 are views showing the relationship between line data in the video memory and a horizontal synchronizing signal or a line clock signal, respectively. The arrow of the line clock signal 19 indicates a timing or increment of a vertical address of the video memory 7, and the arrow of the horizontal synchronizing signal 18 shows a timing for establishing a vertical address (line position) incremented by the line clock 19. Here, explanation will be given on the assumption that lines 15, 18 and 17 are outputted from the video memory 7. In FIG. 4, the vertical address is incremented by one line at a timing indicated by the arrow of the line clock 19 after the arrow of the horizontal synchronizing signal 18, and that address is established at a timing indicated by the arrow of a next horizontal synchronizing signal 18. For this reason, lines 15, 18 and 17 are displayed in sequence. However, in FIG. 5, between the first arrow and the second arrow of the horizontal synchronizing signal 18, the arrow of the line clock signal 19 is inserted twice. Accordingly, before establishment of a vertical address by the second arrow of the horizontal synchronizing signal 18, increment of the vertical address is carried out twice. For this reason, line 17 might be read out at a timing where readout of the line 18 shown in FIG. 4 should be originally carried out, resulting in omission of display of the line 18. As stated above, when there exists a jitter on the line clock signal 19 the state of FIG. 4 and the state of FIG. 5 are repeatedly displayed. Thus, an image flicker 14 as shown in FIG. 3 would take place.

In this conventional processor, a vertical synchronizing signal of a low frequency of several tens Hertz (Hz) is used for the reference input terminal 1 (a) of the PEL circuit 9. Further, the set width of the frequency dividing value M of the frequency divider 8 is generally set to several tens to several thousands, thus to allow the lock range of the frequency divider 8 to be broad. For this reason, the design for constants of the loop filter 2 is not easy, and a large jitter appears on a line clock signal. As a result, there take place portions where jump of the vertical address with respect to the video memory is conducted and portions where no Jump is conducted, leading to an unseemly picture as an image flicker phenomenon in the form of a lateral line. It is generally difficult to precisely calculate a value of jitter because of various complicated conditions. Accordingly, when an actual measurement of jitter is conducted, a value oil 5 to 10 [μS] was observed.

Further, every time alteration of the frequency dividing ratio M value for carrying out an expansion (enlargement) operation or a contraction operation of an image is made, expansion/contraction are repeated in a vertical direction by vibration based on a dumping factor ζ of the PLL circuit 9. Namely, for an acquisition time (time until a frequency difference is locked) of the PLL circuit 9, there results an unseemly picture as an image fluctuation phenomenon in a vertical direction.

Equations for calculating an acquisition time causing an image fluctuation phenomenon in a vertical direction are shown below.

When a control voltage width of VCO 3 is assumed as Vd [V], a gain constant KΦ of the phase comparator 1 is expressed as follows:

$$K\Phi = (Vd/2)/2\pi [V/\text{rad}] \quad (1)$$

When an output frequency width of the VCO 3 is assumed as Fd [Hz], a conversion gain KV of the VCO 3 is expressed as follows:

$$KV = Fd \cdot 2\pi / Vd [\text{rad}/V \cdot s] \quad (2)$$

A loop gain K is expressed as follows:

$$K = K\Phi \cdot KV \quad (3)$$

In the case of an active filter, when $\tau 1 = C.R1$, SQRT=SQUARE ROOT ($\sqrt{\ }$), a natural angular frequency $\omega n$ is expressed as follow $$\omega n = \text{SQRT}(K/\tau 1) \quad (4)$$

On the other hand, in the case where a general condition of $\zeta = 0.7$ V is selected, $\omega n \cdot t$ becomes equal to about 4.5. Accordingly, the natural angular frequency $\omega n$ when the acquisition time is designated at t is expressed as follows:

$$\omega n = 4.5/t \quad (5)$$

When substitution of Eq.(5) into Eq.(4) is made, the acquisition time t is expressed as follows:

$$t = \text{SQRT}(20 \cdot \tau 1/K) \quad (6)$$

It is seen that the acquisition time t is directly affected by the loop gain K. Accordingly, in the case where Vd in the loop gain K is assumed to be fixed, the acquisition time t is greatly affected by the output frequency width Fd of the VCO 3.

DISCLOSURE OF THE INVENTION

An object of this invention is to allow jitter in a PLL circuit and an acquisition time in the PLL circuit to be as minimum as possible, thus to eliminate an image flicker or an image fluctuation phenomenon.

To achieve this object, a video processor according to this invention comprises a video memory for storing a luminance signal in a video signal, a PLL circuit for outputting a signal synchronous in phase with a horizontal synchronizing signal of the video signal, and a frequency divider for frequency-dividing an output of the PLL circuit by N2, an output signal of the frequency divider being inputted to the video memory as a line clock signal for incrementing its vertical address, a frequency dividing Value N1 of an internal frequency divider in the PLL Circuit being permitted to be changed by a command from the external, a frequency dividing value N2 of the frequency divider being set to the number of horizontal synchronizing signals within one period of a vertical synchronizing signal of the video signal.

Since a horizontal synchronizing signal having a high frequency is used as an input signal of the PLL, circuit in place of a vertical synchronizing signal of a video signal, it is possible to allow both jitter and acquisition time t in the PLL circuit to become small. For this reason, even in the case of changing the frequency dividing Value N1 of the internal frequency divider within the PLL circuit to change the frequency of a line clock signal applied to the video memory to thereby carry out expansion (enlargement) or contraction of an image, image flicker and/or image fluctuation phenomena are difficult to occur.

BRIEF DESCRIPTION OF THE DRAWINGS

FIGS. 7A, 7B and 7C are timing charts showing the operation of this embodiment, respectively.

FIGS. 8A and 8B are respectively views for explaining expansion and contraction of an image.

BEST MODE FOR CARRYING OUT THE INVENTION

Figure 1:
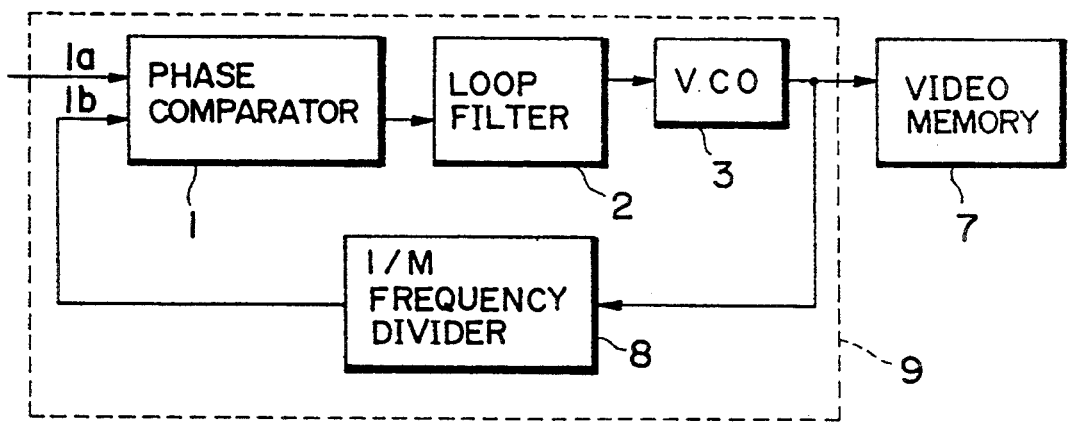
FIG. 1 is a block diagram showing a conventional video processor.
Figure 2:
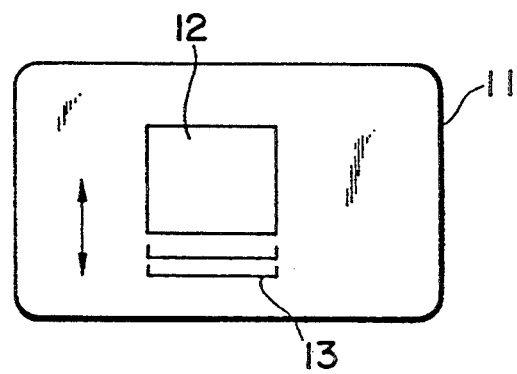
FIG. 2 is a view showing an image fluctuation phenomenon by the conventional processor of FIG. 1.
Figure 3:
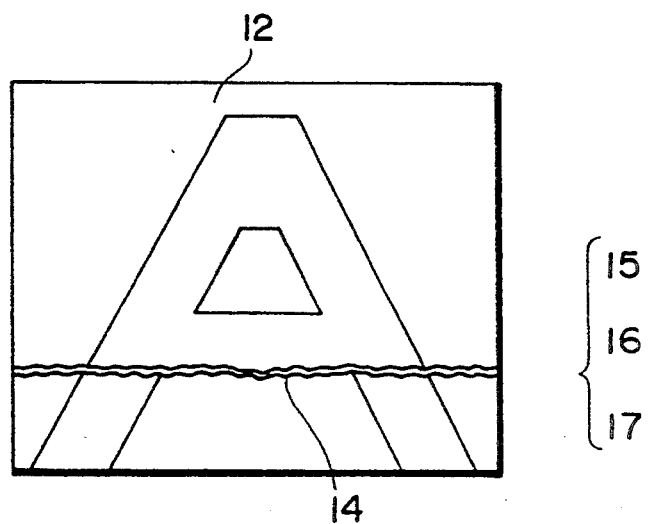
FIG. 3 is a view showing an image flicker phenomenon by the conventional processor of FIG. 1.
Figure 4:
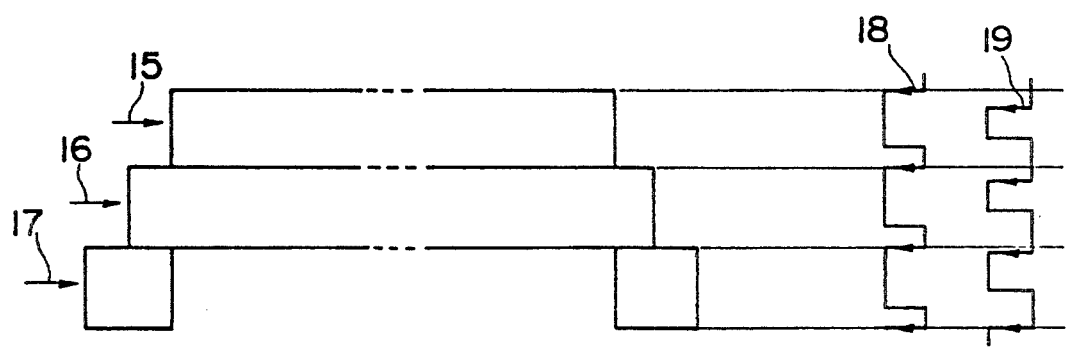
FIG. 4 and 5 are views showing the relationship between line data in the video memory and a holizontal synchronizing signal or a line clock in the conventional processor, respectively.
Figure 5:
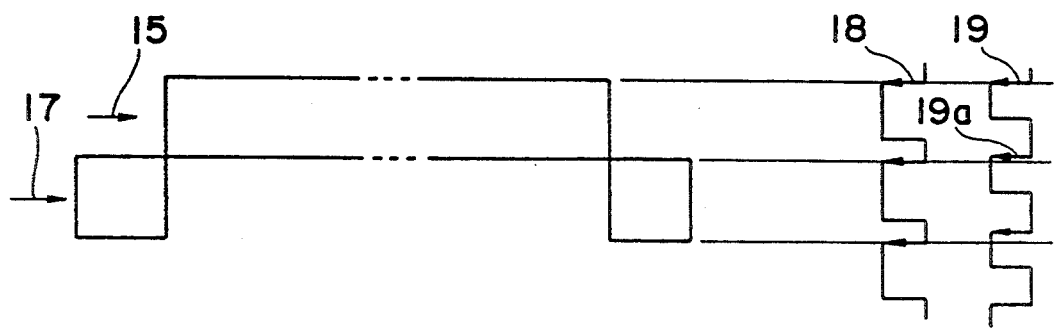
Figure 6:
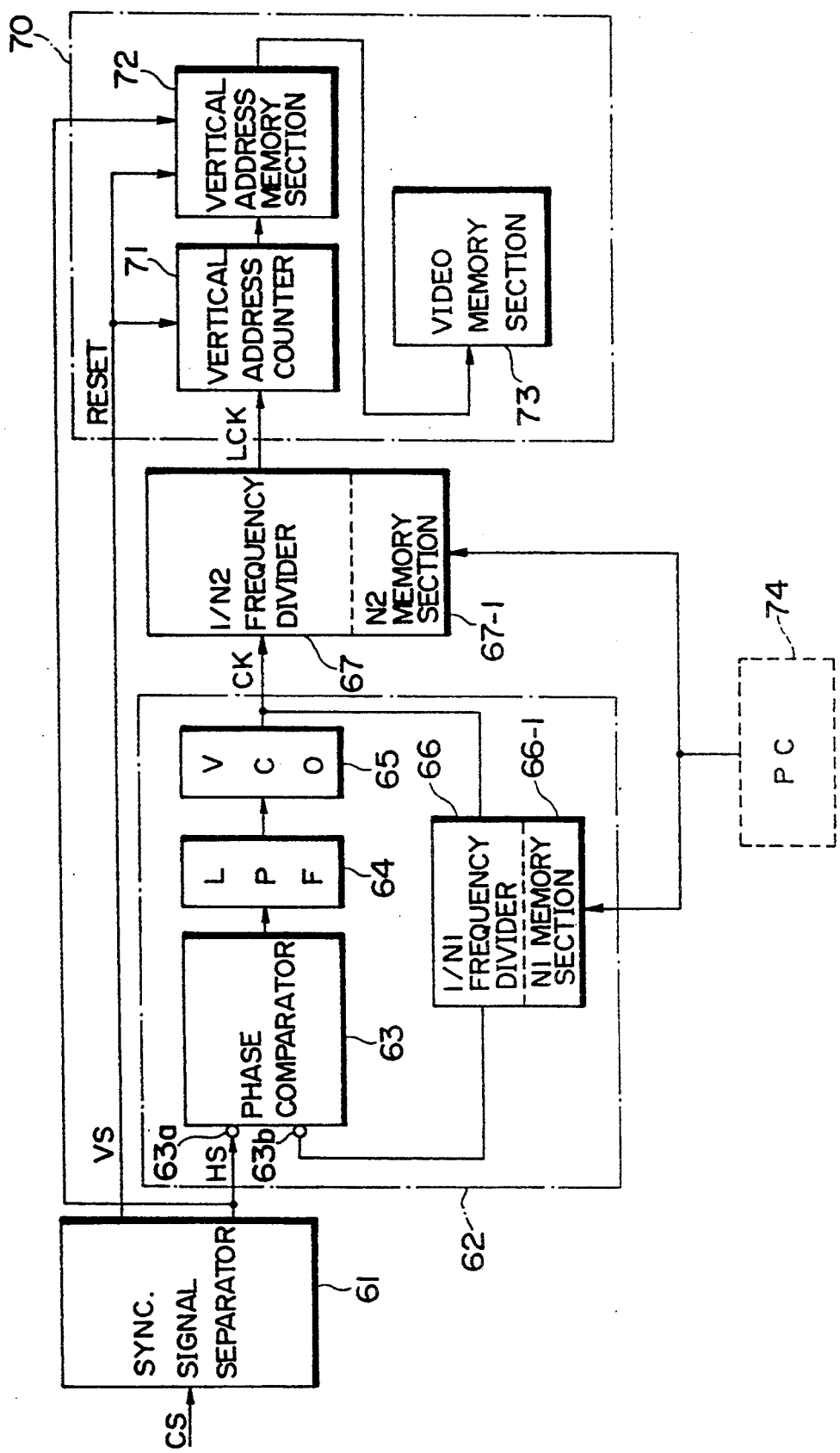
FIG. 6 is a block diagram showing a video processor which is an embodiment of this invention.

In FIG. 6, a synchronizing signal separator 61 is a circuit adapted for separating a vertical synchronizing signal VS and a horizontal synchronizing signal HS from a composite video signal CS. A PLL circuit 62 is comprised of a phase comparator 63, a low-pass filter (LPF) 64 serving as a loop filter, a voltage controlled oscillator (VCO) 65, and a frequency divider 66. To a reference input terminal 63a of the phase comparator 63, the horizontal synchronizing signal HS from the synchronizing signal separator 61 is inputted. Further, to a phase comparison input terminal 63b, a signal from the frequency divider 66 is inputted. An output signal of the phase comparator 63 is inputted to the voltage controlled oscillator 65 through the low-pass filter 64. The voltage controlled oscillator 65 outputs a clock signal CK :having a frequency corresponding to an input voltage. This clock signal CK serves as an output signal as the PLL circuit 62, and is also delivered to the internal frequency divider 66, at which it is frequency-divided by N1. The frequency divided signal thus obtained is fed back to the phase comparator 63. The frequency divider 66 comprises an N1 memory section 66-1 for storing a frequency dividing value N1. The value of the frequency dividing value N1 can be arbitrarily set by changing the content of the N1 memory section 66-1 by a command from an external device such as a personal computer 74, etc.

A frequency divider 67 is a circuit for frequency-dividing an output Signal of the PLL circuit by N2. This frequency divider 67 also comprises an N2 memory section 67-1 for storing a frequency dividing value N2 similarly to the frequency divider 66.

A video memory 70 comprises a vertical address counter 71, a vertical address memory section 72, and a video memory section 73. The video memory section 73 serves to store a luminance signal in a composite video signal CS as digital data. Here, a VRAM (Video Random Access Memory) is used. The vertical address counter is a counter for counting signal (this signal will be referred to as a line clock signal LCK hereinafter) from the frequency divider 67. This counter 71 is reset by the vertical synchronizing signal VS from the synchronizing signal separator 61. The vertical address memory section 72 inputs a count value outputted from the vertical address counter 71 to hold its count value at an input timing of the horizontal synchronizing signal HS from the horizontal signal separator 61. An output value of the vertical address memory section 72 serves as a vertical address signal with respect to the video memory section 73.

The operation of the video processing circuit thus constructed will now be described.

First, a composite video signal CS is inputted to the synchronizing signal separator 61. A horizontal synchronizing signal HS subjected to synchronous separating processing at this circuit is inputted to the reference input terminal 63a of the phase comparator 63 within the PLL circuit 82. At this time, a vertical synchronizing signal VS similarly separated at the synchronizing signal separator 61 resets the vertical address counter 71 and the vertical address memory section 72 within the video memory 70.

In the PLL circuit 62, a clock signal CK outputted from the voltage controlled oscillator 65 is inputted to the frequency divider 66. The frequency divider 66 allows the internal counter to count up every time when a clock signal CK is inputted, and generates a carry output signal when its count value reaches N1 to deliver it to the phase comparison input terminal 63b of the phase comparator 63. The phase comparator 63 determines a phase difference between two input signals respectively inputted to the input terminals 63a and 63b to deliver that phase difference to the low-pass filter 64, at which it is converted to a corresponding voltage. At the voltage controlled oscillator 65, there changes the frequency of a clock signal CK outputted in dependency upon a converted voltage. Such a change is developed so that a phase difference between an input signal to the reference input terminal 63a and an input signal to the phase comparison input terminal 63b becomes minimum. When that phase difference becomes equal to zero, there results a stable state, i.e., a lock state. The clock signal CK outputted from the PLL circuit 62 which has been brought into a lock state in this way is frequency-divided by N2 at the frequency divider 67, resulting in a line clock signal LCK. This line clock signal LCK increments the vertical address counter 71 irrespective of the horizontal synchronizing signal HS. A count value of the vertical address counter 71 is delivered to the vertical address memory section 72 at all times. At this time, the vertical address memory section 72 holds that count value at a timing of the horizontal synchronizing signal HS to deliver it to the video memory section 73 as a vertical address signal. It is to be noted that the value of N2 is set to the number of horizontal synchronizing signals within one period of the vertical synchronizing signal VS.

FIGS. 7A to 7C are timing charts for explaining the operation of this embodiment in more detail. In FIG. 7A, (a), (b) and (c) represents a vertical synchronizing signal VS, a horizontal synchronizing signal HS, and a line clock signal LCK, respectively. FIG. 7B shows a horizontal synchronizing signal HS expanded in time of FIG. 7A(b), and FIG. 7B(b) shows a VCO output signal (clock signal CK) corresponding thereto. FIGS. 7C(a) and (b) show signals further expanded of FIGS. 7B(a) and (b), respectively. When it is assumed that the period of the vertical synchronizing signal VS, i.e., the vertical synchronous period is Tv, the period of the horizontal synchronizing signal HS, i.e., the horizontal synchronous period is Th, the period of the line clock signal LCK is Tx, and the period of the VCO output signal CK is Ti, the period Ti of the VCO output signal CK is expressed as follows:

$$Ti = Th \times 1/N1 \quad (7)$$

Transformation of the equation (7) gives $$Th = Ti \times N1 \quad (8)$$

Further, the period Tx of the line clock signal LCK is expressed as follows:

$$Tx = Ti \times N2 \quad (9)$$

Meanwhile, since the value of N2 is set to the number of horizontal synchronizing signals HS within one period of the vertical synchronizing signal VS, the following equation (10) holds $$Tv = Th \times N2 \quad (10)$$

Substitution of the equation (8) into the equation (10) gives $$Tv = Ti \times N1 \times N2 \quad (11)$$

After substitution of the equation (9) into the equation (11) is made, arrangement is made with respect Tx. As a result, the following equation (12) is provided.

$$Tx = Tv/N1 \quad (12)$$

It is seen from the above equation (12) that the frequency dividing value M of the frequency divider in the PLL circuit of the conventional video processor using a vertical synchronizing signal VS as a reference input signal of the PLL circuit and the frequency dividing value N1 of the frequency divider 66 of this embodiment have the same meaning in respective of the relationship with the period of the line clock signal LCK. Namely, it is possible to vary the line clock signal LCK irrespective of the horizontal synchronizing signal HS. Thus, expansion (enlargement) or contraction of an image can be carried out.

Figures 8A, 8B:
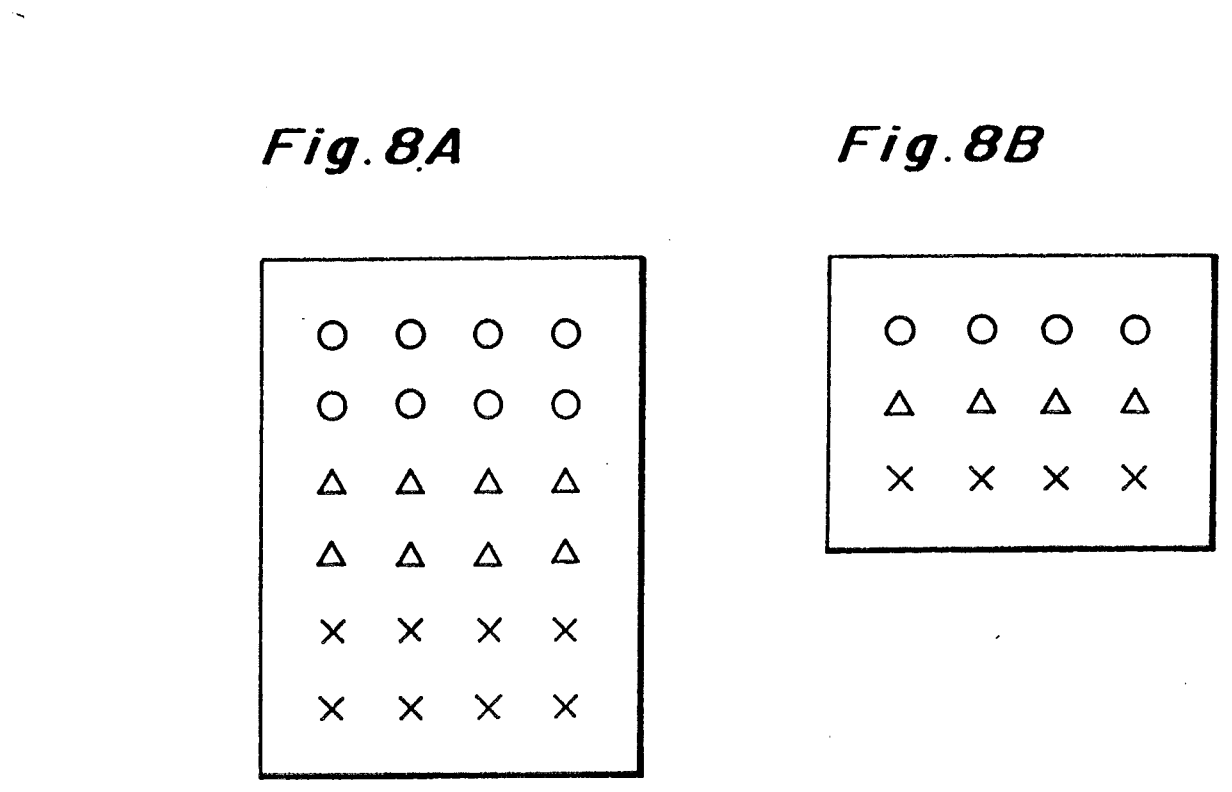

FIGS. 8A and 8B are respectively views for explaining expansion (enlargement) and contraction of an image. Explanation will be first given in connection with the case where data written in the video memory section 73 is read out. It is now assumed that FIG. 7A shows the content of video data of the video memory section 73. For example, when N1 is set so that the frequency of the line clock signal LCK becomes equal to a value twice greater than that of the horizontal synchronizing signal HS, video data in a vertical direction of the video memory section 73 is read out every other line. For this reason, as shown in FIG. 8B, video data thinned every line in a vertical direction is provided. Thus, and image contracted to one half in a vertical direction is provided.

On the other hand, in order to provide a twice enlarged image, when setting is made such that the frequency of the lime clock signal LCK becomes equal to a value one half of that of the horizontal synchronizing signal HS, the same video data are provided in such a manner that they are adjacent in a vertical direction. Thus, an image enlarged twice in a vertical direction is provided. In this case, contrary to the above, FIG. 8B shows the content of video data of the video memory section 73 and FIG. 8A shows an image read out.

Further, in the case where FIG. 8A is assumed to show the content of a video signal to contract an image to one half in a vertical direction to write it into the video memory section 73, setting is made such that the frequency of the line clock signal LCK becomes equal to a value twice greater than that of the horizontal synchronizing signal HS. By writing every other line video signal into the vertical address of the video memory section 73, video data in a vertical direction is thinned. As a result, video data is contracted to one half in a vertical direction. Thus, video data as shown in FIG. 8B will be written into the video memory section 73.

The frequency of the line clock signal CLK prescribing the resolution in a vertical direction of an image can be arbitrarily set by the N1 value stored in the memory section 66-1 as previously described. For this reason, an arbitrary enlargement/contraction in a vertical direction of an image can be carried out.

Industrial Applicability

In accordance With this invention, it is possible to arbitrarily carry out enlargement/expansion of an image. In addition, since a horizontal synchronizing signal HS having a higher frequency as compared to vertical synchronizing signal VS is used as a reference input signal of the PLL circuit for preparing a line clock signal delivered to the video memory, the loop gain K of the PLL circuit can be increased. Accordingly, the acquisition time is reduced to a value of the order of 1/SQRT (several hundreds). As a result, an image fluctuation in a vertical direction at the time of enlargement/contraction in a vertical direction is difficult to occur. Further, even if the lock range is caused to be broad to the same degree as in the prior art, jitter is greatly reduced to such an extent that its actual measured value is 1 to 100 [nS]. Accordingly, an image flicker in the form of a lateral line by jitter can be eliminated.

I claim:

1. A video processor having a video memory for storing a luminance signal in a video signal, and performing enlargement or contraction in a vertical direction of an image, said video processor comprising:

a PLL circuit for outputting a signal synchronous in phase with a horizontal synchronizing signal of said video signal, and an output frequency divider for frequency-dividing said output signal of said PLL circuit by N2, an output signal of said output frequency divider being inputted to said video memory as a line clock signal for incrementing a vertical address of said video memory, a first frequency dividing value N1 of an internal frequency divider in said PLL circuit being permitted to be changed by a command provided from a source external to said internal frequency divider, and a second frequency dividing value N2 of said output frequency divider being set to the number of horizontal synchronizing signals within one period of a vertical synchronizing signal of said video signal.

2. A video processor as set forth in claim 1, wherein said internal frequency divider comprises a memory section for storing the first frequency dividing value based on a command provided from a source external to said internal frequency divider.

3. A video processor as set forth in claim 1, wherein said video memory comprises a video memory section for storing said luminance signal, a vertical address counter incremented by an output signal of said frequency divider, and a vertical address memory section for outputting a count value of said vertical address counter as an address of said video memory section in synchronism with said horizontal synchronizing signal.

4. A video processor having a video memory for storing a luminance signal in a video signal, and performing enlargement or contraction in a vertical direction of an image, said video processor comprising:

a PLL circuit for outputting a signal synchronous in phase with a horizontal synchronizing signal of said video signal, and an output frequency divider for frequency-dividing said output signal of said PLL circuit by N2, an output signal of said output frequency divider being inputted to said video memory as a line clock signal for incrementing a vertical address of said video memory, a first frequency dividing value N1 of an internal frequency divider in said PLL circuit being permitted to be changed by a command provided from a source external to said internal frequency divider, a second frequency dividing value N2 of said output frequency divider being permitted to be changed by a command provided from a source external to said output frequency divider, and said output signal of said PLL circuit which is supplied as an input signal of said output frequency divider, said output signal of said PLL circuit having a period 1/N1 times that of said horizontal synchronizing signal.

5. A video processor as set forth in claim 4, wherein said internal frequency divider comprises a memory section for storing the first frequency dividing value based on a command provided from a source external to said internal frequency divider.

6. A video processor as set forth in claim 4, wherein said video memory comprises a video memory section for storing said luminance signal, a vertical address counter incremented by an output signal of said frequency divider, and a vertical address memory section for outputting a count value of said vertical address counter as an address of said video memory section in synchronism with said horizontal synchronizing signal.

* * * * *